UNITED STATES PATENT OFFICE.

COLONEL E. BRIGHT, OF COLUMBUS, OHIO.

FOOD PRODUCT.

No. 805,001.     Specification of Letters Patent.     Patented Nov. 21, 1905.

Application filed June 19, 1905. Serial No. 266,048.

*To all whom it may concern:*

Be it known that I, COLONEL E. BRIGHT, a citizen of the United States, residing at Columbus, in the county of Franklin and State of Ohio, have invented certain new and useful Improvements in Food Products, of which the following is a specification.

This invention relates to edible compositions, and especially to food compounds which, while adapted for general consumption, are intended more particularly for use as rations for troops, travelers, explorers, campers, and the like.

The lean of beef is recognized as being in a high degree a nourishing and valuable aliment for the rapid repair of waste muscular tissue, but for its proper digestion and assimilation it should form a relatively small part of the ordinary diet of the user. Taken in excessive quantities it produces disarrangements of the digestive organs even in the case of persons engaged in highly-laborious occupations. The fat of beef possesses in a very high degree the properties of assuaging hunger without producing an abnormal thirst and of maintaining a proper body temperature; but by reason of the high percentage of stearin in beef-fat it is in its natural state almost impossible to digest in anything but very small amounts. The indigestibility of beef-fat in its natural state almost wholly precludes its use as a food except in very small quantities and in the cases of certain toothsome desserts which are proverbially indigestible—as, for example, suet pudding and mince-pie. This indigestibility of beef-fat, which prevents the use as food of the greater part of the fat of beef, is a great source of loss to packers, it being estimated that an average of something over five dollars a head is lost on every beef slaughtered as compared with what would be realized were such fat available for use as a wholesome food in its natural state.

It is the object and purpose of this invention to provide a food of the character hereinbefore specified in which the lean of beef is combined with other food materials of such character and in such proportions that the deleterious effects above specified will be overcome and the beef may be eaten in any quantity required without injurious effects upon the digestion of the user.

A further object of the invention is to provide a food containing beef-fat in which the character of the beef-fat is so modified that it is rendered readily digestible and assimilable without depriving the said fat of its conspicuous properties of assuaging hunger without creating an abnormal thirst and of maintaining a proper body temperature.

To this end the process of producing my improved food product consists in its preferred embodiment in adding to and combining with the lean of beef and beef-fat cornmeal or other like material containing a large proportion of starch and a fat containing little or no stearin and a very high percentage of olein. The fat of beef contains normally over twenty-five per cent. of stearin, while the oil, which forms from six to eight per cent. of cornmeal, contains practically no stearin and a very high percentage of olein. A combination of the two fats so modifies the properties of each that a readily digestible and assimilable fat is produced therefrom.

In producing my food product in its preferred form I grind or chop beef, including the lean of beef and the beef-fat, preferably in the proportions of four parts, by weight, of the former to one of the latter. I then heat water, preferably containing a small quantity of salt, to the boiling-point and add the comminuted lean and fat of beef thereto. When the beef is thoroughly heated, I gradually add cornmeal, stirring the several ingredients to effectively commingle them. I boil the ingredients above mentioned for preferably about thirty minutes, during which time the beef-fat will unite with the corn-oil from the cornmeal, forming a fatty preparation which is readily digestible. This fatty preparation takes up the highly-nutritive juices from the muscular tissue of the meat as they issue therefrom and prevent the escape of the volatile essences of such juice, thereby giving not only to the said fatty preparation, but to the entire food product, the delicate and highly-delightful flavor characteristic of the beef employed.

The proportions which I prefer to employ in the preparation of my improved food product are as follows: ground lean of beef, eighty parts, by weight; ground beef-fat, twenty parts, by weight; cornmeal, three hundred parts, by weight; water, one hundred parts, by weight; common salt, three parts, by weight. The proportions stated provide a food containing about nine per cent. of fat in which the proportion of stearin constitutes approximately thirteen per cent.

By suitably regulating the time of boiling or the quantity of water employed the food preparation may be given the form of either a soft or a thick paste, or the material may be boiled down until the product has a solid consistency.

The material is preferably placed in cans and hermetically sealed immediately after completing the boiling operation.

The use of the cornmeal in connection with the chopped beef-fat and muscular tissues of beef has the effect of preserving such fat and muscular tissue, so that the resulting food compound can be kept unaltered without the use of any antiseptic or other preserving agent.

The material is succulent and toothsome without further cooking or other treatment; but its taste is somewhat improved by frying it, the food itself requiring nothing to be added, as the compound fat in the food takes the place of other fats ordinarily used in frying.

The material may be employed in numerous other ways, one of the most satisfactory of which is as a basis of soup, tomatoes, onions, potatoes, and other vegetables commonly added to soup-stock being employed in connection with my improved food preparation.

A food compound prepared in accordance with my improved process is particularly well adapted for use as rations by troops, travelers, explorers, and the like by reason of the following properties which it possesses: First, it contains in a very high degree the materials needed to nourish the body, maintain a proper body temperature, and repair waste muscular and adipose tissue; second, it is easily digested and capable of being readily absorbed and assimilated; third, it is satisfying to the consumer, so that small quantities will assuage hunger; fourth, it is of such a character as not to produce an abnormal thirst; fifth, it nourishes in a large measure the entire body, so that no part, organ, or function is weakened by its use; sixth, it is palatable to persons of widely-different tastes; seventh, it can be eaten more or less continuously for a long time without cloying the consumer's appetite; eighth, it is capable for being prepared for consumption in various ways, so that it may be served in widely-diversified forms and given a variety of flavors.

While I have thus described my invention as applied to the treatment of the lean of beef and beef-fat, it is to be understood that it is adapted to the treatment of other muscular tissues and to other fats having a similarly high percentage of stearin.

Having thus described my invention, what I claim as novel, and desire to secure by Letters Patent, is—

1. A food product comprising fat, muscular tissue and cornmeal, the entire fat content of the said product containing between ten and fifteen per cent. stearin.

2. A food product comprising fat, muscular tissue and cornmeal, the entire fat content of the said food product containing about thirteen per cent. stearin.

3. A food product comprising fat, muscular tissue and cornmeal, the entire fat content of said food product containing about thirteen per cent. stearin and said fat content constituting about nine per cent. of the entire compound.

4. A food product comprising beef-fat, lean of beef and cornmeal, the entire fat content of the said food product comprising between ten and fifteen per cent. stearin.

In testimony whereof I affix my signature in presence of two witnesses.

COLONEL E. BRIGHT.

Witnesses:
A. L. PHELPS,
M. B. SCHLEY.